Figure 1:
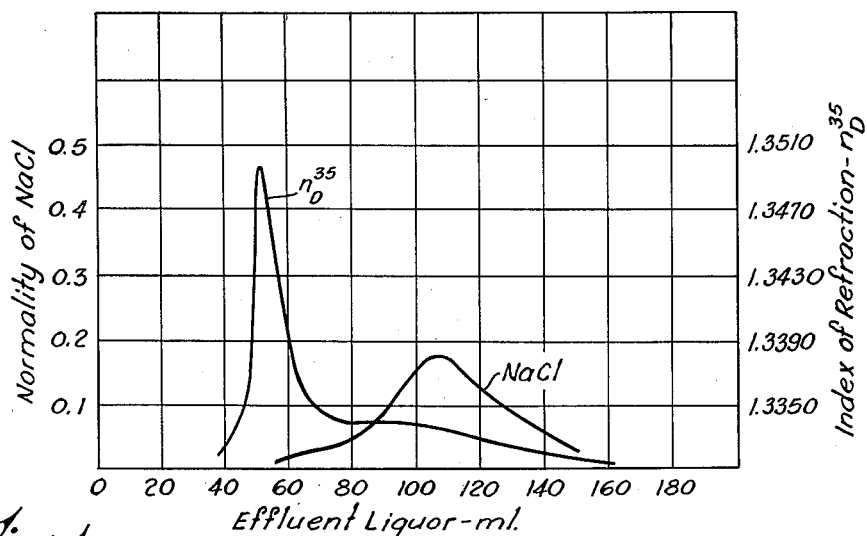

INVENTOR.
Melvin J. Hatch

INVENTOR.
Melvin J. Hatch
BY
Griswold & Burdick
ATTORNEYS

Feb. 19, 1963   M. J. HATCH   3,078,140
ION RETARDATION METHOD OF SEPARATING SOLUTES
Filed Sept. 29, 1955   4 Sheets-Sheet 3

INVENTOR.
Melvin J. Hatch
BY
Griswold & Burdick
ATTORNEYS

INVENTOR.
Melvin J. Hatch
BY
Griswold & Burdick
ATTORNEYS 3,078,140
ION RETARDATION METHOD OF SEPARATING SOLUTES
Melvin J. Hatch, Midland, Mich., assignor to The Dow Chemical Company, Midland, Mich., a corporation of Delaware
Filed Sept. 29, 1955, Ser. No. 537,408
14 Claims. (Cl. 23—1)

This invention concerns a novel method of treating aqueous solutions of two or more solutes, at least one of which is ionizable, to effect an at least partial separation of the solutes from one another. More specifically, it pertains to a method wherein the starting solutions is contacted with a solid material having a property of preferentially absorbing, and/or more tenaciously retaining in absorbed condition, certain ions or an ionizable solute than one or more other solutes, so that the latter may be swept from the thus-loaded solid material by an aqueous liquid and having a further property of permitting subsequent extraction of the absorbed ions, or the absorbed ionizable solute, from the solid material by water or other suitable aqueous liquid so as to regenerate the solid material and place it in condition for re-employment. It pertains more particularly to such a method wherein certain or all of the ions, but not all of the solutes, in the starting solution are caused to enter into a loose chemical combination with one or more of certain solid contact materials which thus retard flow, or migration, of said ions through or from the contact material while permitting withdrawal of remaining portions of the solution, and from which solid undissolved contact material the chemically absorbed ions can be removed by washing, or extraction, with water. By thus retarding the migration of certain, or all, of the ions of the starting solution while causing an aqueous liquid, e.g. the remainder of the solution, containing a considerable portion of at least one of the solutes, to flow over, through, and/or from the body of solid contact material, a separation of two or more of the solutes in the starting solution can be effected.

The solid contact materials which are employed in the process of the invention are ion exchange agents containing, in the individual particles or granules thereof, ionizable groups capable of exchanging cations and, also, ionizable groups capable of exchanging anions. Amphoteric ion exchange resins, such as those preparable by reacting trimethylamine with copolymers of vinylbenzyl chloride, acrylic acid, ethylvinylbenzene and divinylbenzene, which resins contain both cation-exchanging and anion-exchanging groups in a single resin molecule, can be employed, as such or in the form of their salts, as the solid contact materials in the process of the invention. However, the amphoteric resins, containing both anion- and cation-exchanging radicals in a single, cross-linked, resin molecule, have not been found as satisfactory for use in the process of the invention as are the composite ion exchange resin bodies, containing cation- and anion-exchanging groups in different, but apparently entangled resin molecules, which are hereinafter described. The amphoteric resins, containing cation- and anion-exchanging groups in a single resin molecule, either were of undesirably low ion absorptive capacity when tested for the absorption of neutral salts from aqueous solutions, or failed to release the chemically absorbed ions as readily as is desired when washed with water. These short-comings of the known amphoteric ion exchange resins are believed to be due to the fact that the cation- and anion-exchanging groups are attached at various points in a single, rigid, cross-linked resin molecule and thus are prevented from undergoing appreciable relative movements toward or away from, one another. However, the invention is not limited by this, or any other, theory in explanation of the results obtained.

Composite bodies of molecularly entangled cation-exchanging and anion-exchanging resins, such as have proven more satisfactory and are advantageously employed in the process of the invention, are disclosed and claimed in my copending application Serial No. 475,003, filed December 13, 1954, now Patent No. 3,041,292, of which the present application is a continuation-in-part.

The composite ion exchange resin bodies of said copending application comprise two or more intimately associated and apparently molecularly entangled resins, at least one of which is an insoluble, cross-linked resin that may or may not possess ionizable groups and at least two of which are ionizable resins containing cation- and anion-exchanging groups, respectively. Either or both of the ionizable resin ingredients may be amphoteric, i.e. may contain both of the types of ionizable groups just mentioned, provided one of the resins contains cation-exchanging groups and another contains anion-exchanging groups. It is necessary that at least one of the resin ingredients be an insoluble cross-linked resin, and both or all of the resin ingredients may be insoluble and cross-linked. However, an insoluble cross-linked resin is capable of entrapping and thus insolubilizing resins, especially ionizable resins, which normally are soluble, i.e. which, when tested alone, are capable of being dissolved by water, aqueous acid solutions, aqueous alkali solutions, or by organic solvents, when the normally soluble resins are formed within a body of the insoluble, cross-linked resin and are apparently molecularly entangled with the latter. Composite ion exchange resin bodies of this type, comprising an insoluble cross-linked resin having one or more ionizable resins (that alone are capable of being dissolved) insolubilized by intimate association or molecular entanglement therewith are most conveniently and economically prepared and are preferred. The insoluble cross-linked resin ingredient may be, and preferably is, an ion exchange resin. However, it may be a non-ionizable resin, e.g. a copolymer of styrene and divinylbenzene, and may be intimately associated with two or more ionizable resins, which alone would be soluble, in a manner such as to entrap and insolublize the otherwise soluble ionizable resins.

In any instance, the composite ion exchange resin bodies just mentioned comprise in insoluble, or insolubilized, form at least two ionizable resins comprising cation- and anion-exchanging groups respectively. Except for an ability of the ionizable resin ingredients to form salts with one another, the resin ingredients are not chemically combined, but apparently are molecularly entangled, with one another.

An entrapped and thus-insolubilized normally-soluble, ionizable resin ingredient is capable of functioning as an ion exchange resin and is hereinafter regarded as an ion exchange resin ingredient of the composite ion exchange resin body.

The composite ion exchange resin bodies usually comprise from 0.3 to 3, advantageously from 0.5 to 2, and preferably about 1, chemical equivalent of anion exchange resin ingredient per chemical equivalent of cation exchange resin ingredient, but they may contain said ingredients, or the respective ion exchanging groups or radicals thereof, in other proportions.

Examples of resins, e.g. polymers and condensation polymers, that may be employed as ingredients of the composite bodies are sulfonated polystyrene, sulfonated polyvinyltoluene; sulfonated copolymers of styrene and vinyltoluene; polyacrylic acid; copolymers of styrene and maleic anhydride; sulfonated phenol-formaldehyde resins; resinous condensation products of phenol, formaldehyde, and one or more alkylene- or polyalkylene-polyamines such as ethylene diamine, diethylenetriamine, triethylenetetramine, or tetraethylenepentamine; copolymers of styrene and divinylbenzene, copolymers of styrene, ethylvinylbenzene and divinylbenzene; copolymers of styrene, alpha-methylstyrene, ethylvinylbenzene and divinylbenzene; copolymers of vinylxylene and divinylbenzene; sulfonated copolymers of styrene and divinylbenzene; sulfonated copolymers of styrene, ethylvinylbenzene and divinylbenzene; sulfonated copolymers of vinyltoluene, ethylvinylbenzene and divinylbenzene; copolymers of acrylic acid, ethylvinylbenzene and divinylbenzene; copolymers of methacrylic acid, ethylvinylbenzene and divinylbenzene; copolymers of styrene, ethylvinylbenzene and divinylbenzene comprising quaternary ammonium radicals as nuclear substituents; and copolymers of styrene, ethylvinylbenzene and divinylbenzene containing polyalkylpolyamine groups, such as

—CH$_2$NHCH$_2$CH$_2$NH$_2$ groups, as nuclear substituents; etc. The invention is particularly concerned with composite ion exchange resin bodies comprising copolymers of a major proportion, e.g. 80 weight percent or more, of one or more monoalkenyl aromatic hydrocarbons and a minor proportion of one or more polyvinyl aromatic hydrocarbons such as divinylbenzene, or divinyltoluene, etc., which copolymers preferably contain ionizable groups as substituents and are, of themselves, effective as ion exchange agents. These copolymers and ionizable derivatives thereof are useful as the insoluble, cross-linked polymer ingredients of the composite resin bodies.

The composite ion exchange resin bodies of the copending application Serial No. 475,003 are preferably prepared by admixing a liquid monomeric material, having, in at least some of the molecules thereof, groups or radicals that are ionizable or that can readily be converted to ionizable groups, with an insoluble, cross-linked polymer containing ionizable groups and permitting the monomeric material to be absorbed by the polymer. The insoluble polymer may be dry, or may be wet or swollen with an inert liquid such as water or an organic liquid, when contacted with the liquid monomeric material. The liquid monomeric material, consisting of one or more polymerizable vinylidene compounds may be in undiluted form or may contain an inert liquid solvent therefor, or other dissolved additives, e.g. plasticizers, lubricants, or a minor amount of a peroxy compound such as sodium or potassium persulfate, tertiary-butyl hydroperoxide, di-(tertiary-butyl) peroxide, or hydrogen peroxide, or other polymerization catalyst, but the catalysts or other additives just mentioned are not required. Unabsorbed monomeric material, if present, may be washed, drained, or otherwise removed from the thus-treated insoluble polymer which, preferably, is in a granular or powdered form. The insoluble, cross-linked polymer is brought to, or maintained at, a temperature such as to convert the absorbed monomeric material to a polymer thereof. The polymerization sometimes occurs at a satisfactory rate at room temperature, especially in instances in which the monomers undergo an addition, rather than condensation, type of polymerization reaction and a catalyst is present to accelerate the reaction. Often the material is heated, e.g. at from 40° to 100° C. or above, to accomplish the reaction at a fairly rapid rate. The polymerization can be carried out in the presence or absence of a liquid medium. It is usually accomplished while having the granules of cross-linked polymer containing the absorbed monomeric material, immersed in an inert liquid. The latter may be a solvent for the monomer when the latter is an ionizable material which is reactive with the insoluble, cross-linked polymer to form a salt of the latter. Otherwise, the inert liquid medium, if employed, is preferably a non-solvent for the monomeric material.

The composite resin body thus formed consists essentially of at least two resins, containing cation- and anion-exchanging groups, respectively, intimately associated and apparently molecularly entangled with one another, but not chemically combined except possibly by formation of an ionizable salt of one such resin with the other.

In instances, in which the insoluble cross-linked ion exchange resin starting material (e.g. a cross-linked anion exchange resin) is caused to absorb a polymerizable liquid (such as a solution of a major amount of vinylbenzene sulfonic acid and a minor amount of divinylbenzene) which is capable of reaction to form a cross-linked ion exchange resin, the composite body which is obtained as a product comprises two or more molecularly-entangled, insoluble, cross-linked ion exchange resins which are not chemically combined, except possibly by formation of a salt of one of the resins with the other, and which resins preferably comprise cation- and anion-exchanging groups, respectively. The composite bodies of such molecularly-entangled, cross-linked, anion- and cation exchange resins can satisfactorily be used in the process of the invention, but are more difficult, and usually more expensive, to prepare than are the preferred composite ion exchange resin bodies mentioned below.

In instances in which the polymerizable liquid starting material that is absorbed in an insoluble, cross-linked ion exchange resin starting material, is one that forms an ionizable polymer which of itself (i.e. in the absence of the cross-linked ion exchange resin) is soluble in an aqueous or organic liquid, a portion of the polymer which is formed may be washed from the outer portions, or surfaces, of the resulting composite polymer bodies. However, a considerable portion of the ionizable polymer thus formed is trapped within and apparently is molecularly entangled with, the insoluble, cross-linked polymer and is not dissolved, or extracted, from the latter. The trapped portion of the normally soluble, ionizable resin is available to aqueous liquids contacted with the composite polymer body and is capable of functioning as an ion exchange agent.

Examples of composite ion exchange resin bodies which may be prepared as just described are that of an insoluble, cross-linked copolymer of a major amount of styrene, a minor amount of ethylvinylbenzene and from 0.5 to 12 percent by weight of divinylbenzene, which copolymer contains either tetramethyl-ammonium radicals, —CH$_2$(CH$_3$)$_3$N$^+$, or trimethyl, ethanol-ammonium radicals, —CH$_2$(CH$_3$)$_2$N(—CH$_3$CH$_2$OH)$^+$, as nuclear substituents and is intimately associated with polyacrylic acid; an insoluble, cross-linked copolymer derivative of either of the kinds just mentioned, intimately associated with poly-[vinylbenzene sulfonic acid]; an insoluble cross-linked, sulfonated copolymer of styrene, ethylvinylbenzene and divinylbenzene, which copolymer is intimately associated with polyethylenimines; an insoluble, cross-linked sulfonated copolymer of vinyltoluene, ethylvinylbenzene, and divinylbenzene, the copolymer being associated with poly-[vinylbenzyl trimethylammonium hydroxide]; and an insoluble sulfonated phenol-formaldehyde resin associated with poly-[vinylbenzyl trimethyl-ammonium hydroxide]; etc.

It has been found (1) that active forms of amphoteric ion exchange agents, especially the hereinbefore-described amphoteric composite ion exchange resin bodies, when contacted with an aqueous starting solution of two or more solutes, at least one of which solutes is ionizable, are capable of entering into a loose chemical combination with certain ions, or an ionizable solute, of the starting solution so as to preferentially or more strongly absorb, or more tenaciously hold in absorbed condition, said ions or ionizable solute than one or more of the other solutes initially present in the starting solution and (2) that the chemically absorbed ions can be extracted from the amphoteric ion exchange agent with water or any other aqueous liquor which initially is substantially free of said ions. The selectivity of the amphoteric ion exchange agent in absorbing certain ions, or an ionizable solute, more readily, tightly, or tenaciously than one or more of the other solutes of the starting solution can be applied to effect a separation of two or more of the solutes in the starting solution by (a) causing the agent to preferentially absorb certain ions, or an ionizable solute, from the starting solution to leave a major proportion of one or more other solutes dissolved in the surrounding liquor which may be removed, or (b) causing the agent to absorb a major amount of each of two or more solutes, including at least one ionizable solute, from the starting solution and subsequently eluting with water or other suitable aqueous liquid, whereby one of the solutes is more readily or rapidly extracted from the agent than another. It usually is advantageous to accomplish the separation by preferential absorption of certain ions, or an ionizable solute, from the starting solution, but in practice the separation of the solutes may occur in part by such preferential absorption of certain ions, or an ionizable solute, in the absorption stage of the process to leave a major portion of another solute in the resulting effluent liquor and in part by a preferential, or more rapid, desorption of one of the absorbed solutes from the agent in the eluting stage of the process.

More particularly, it has been found that an aqueous starting solution of two or more solutes, at least one of which is ionizable, can be passed into contact with an amphoteric ion exchange agent to cause selective chemical absorption of ions of an ionizable solute by the agent to leave a major proportion of one or more other solutes dissolved in the surrounding liquor which may be removed, e.g. by decanting or by displacement with water, from the ion exchange agent to effect an at least partial separation of two or more of the solutes present in the starting solution. It has further been found that the absorbed ions are held in a loose chemical combination with the amphoteric ion exchange agent and that they can be washed or extracted with water from the agent to regenerate the latter and obtain an aqueous solution of the ions, e.g. of the ionizable solute. It has still further been found that the operations just mentioned can advantageously be accomplished by passing a stream of the starting solution into contact with the amphoteric ion exchange agent and then contacting the latter with a stream of water or other suitable aqueous liquid to displace, or flush, the unabsorbed portion of the feed liquor from the resin, e.g. as an early fraction of the effluent liquor, and then to extract chemically absorbed ions from the agent to form an aqueous solution of an ionizable solute as a later fraction of the effluent liquor and thus regenerate the agent.

The method can be applied to effect a separation of an ionizable solute from a non-ionized solute; or to separate one ionized solute from another ionized solute; or to cause occurrence of metathesis reactions between ionizable starting material; etc. The accompanying drawing is a series of graphs illustrating such separations. The graphs are based upon data obtained in experiments presented as specific examples hereinafter, and will be described more fully in the examples.

In practice of the invention, an aqueous solution of two or more solutes, at least one of which is ionizable, is brought into contact with granules, or a powder, of an amphoteric ion exchange agent in a chemical form capable of absorbing ions from the solution. The amphoteric ion exchange agent is advantageously one of the above-described composite ion exchange resin bodies, preferably such body comprising a normally soluble ionizable resin that is insolubilized by intimate association, or molecular entanglement, with an insoluble cross-linked ion exchange resin.

The amphoteric ion exchange agents just mentioned contain both cation- and anion-exchanging groups and are capable of chemically absorbing cations, or anions, or both, from aqueous solutions of bases, acids or salts that are contacted therewith. For such chemical absorption of cations it is necessary, of course, that at least some of the cation-exchanging groups of the resin initially be free of cations of the kind to be absorbed from the solution. Similarly, in order for the ion exchange material to chemically absorb anions from an aqueous solution it is necessary that at least part of the anion-exchanging groups of the ion exchange material initially be free of ions of the kind to be absorbed. For instance, an amphoteric ion exchange resin initially loaded with sodium and sulfate ions can be employed to chemically absorb potassium and chloride ions from an aqueous potassium chloride solution with resultant release of at least a portion of its sodium and sulfate ions into the solution. The amphoteric ion exchange resin initially loaded with sodium and sulfate ions can also be applied either to chemically absorb potassium, but not sulfate, ions from an aqueous potassium sulfate solution or to chemically absorb bromide, but not sodium, ions from an aqueous sodium bromide solution. When a considerable proportion of the cation-exchanging and anion-exchanging groups of an amphoteric ion exchange agent are in their acidic and basic forms, respectively (which acidic and basic groups may in some instances be combined as a salt of one ion exchange resin ingredient with another), the amphoteric ion exchange agent can be applied to chemically absorb and remove part or substantially all of the ions, e.g. either cations, or anions, or both, from aqueous solutions of ionizable acids, bases, or salts.

When the aqueous starting solution contains a non-ionizable, or only slightly ionizable solute, e.g. a sugar, an alcohol, or acetone, etc., and one or more highly ionizable solutes such as sodium chloride, hydrochloric acid, or sodium hydroxide, and a suitable amphoteric ion exchange agent, preferably one of the aforementioned amphoteric composite ion exchange resins, is contacted therewith, the resin chemically absorbs ions from the solution and usually leaves a major portion of the less ionized solute in the surrounding liquor. If the amphoteric ion exchange agent is initially in the form of an internal salt thereof, or in a condition containing the acidic form of its cation-exchanging groups and the basic form of its anion-exchanging groups, it can be applied to demineralize, or substantially demineralize, the above-mentioned aqueous starting solution to leave the non-ionized or less ionized solute in the surrounding liquor.

The surrounding liquor may then be withdrawn from contact with the ion exchange material and the absorbed ions can be washed or extracted from said material with an aqueous liquid that initially is substantially free of said ions, preferably with water. In practice, these two operations are usually combined as a single operation, i.e. when the amphoteric ion exchange agent has chemically absorbed ions from a starting solution in which it is immersed, water is fed to the mixture to displace the resulting aqueous solution of the less ionized solute from the bed of ion exchange material with a result that an early fraction of the effluent liquor is a solution of the non-ionized, or less ionized, solute in a form relatively free of the highly ionized solute. However, the water, during passage through the bed of ion exchange material, extracts the chemically absorbed ions from the bed with a result that a later fraction of the effluent liquor is a solution of the thus-extracted ions, e.g. of the highly ionized solute; and the ion exchange material is thereby regenerated and brought to a condition suitable for re-employment, as just described, to treat a further amount of the starting solution. In place of water alone, any aqueous liquid which initially is substantially free of the ions to be recovered from the ion exchange agent can be used to extract said ions from the agent.

Instead of employing a fixed bed of the granular amphoteric ion exchnge material and operating in the manner just described, the amphoteric ion exchange material may repeatedly be circulated, e.g. as a stream of the granular material, first into contact with a stream of the starting solution (so as to chemically absorb ions from the solution and leave one or more other solutes in the resulting effluent liquor) and then into contact with a stream of water, or other suitable aqueous liquid, which extracts absorbed ions from the amphoteric ion exchange material to regenerate the latter and thus form an effluent solution of an ionizable solute. The relative rates of circulation of the amphoteric ion exchange material and of flow of the liquid streams just mentioned may be regulated to obtain optimum separation of two or more of the solutes initially present in the starting solution.

Either of the modes of operation just described can be applied to any of a variety of aqueous starting solutions and for any of a number of purposes.

For instance, when the aqueous starting solution comprises two or more kinds of ionizable compounds as solutes, e.g. contains two kinds of cations and two kinds of anions, the amphoteric ion exchange material displays a selectivity (of absorbing one of the kinds of cations in preference to the other) which is similar to that of a corresponding cation exchange agent not containing anion-exchanging groups and the amphoteric ion exchange material displays a selectivity (of absorbing one of the kinds of anions from the solution in preference to the other kind of anion) which is similar to that of a corresponding anion exchange agent not containing cation-exchanging groups. In other words, the selectivity of the cation-exchanging groups of an amphoteric ion exchange agent in chemically absorbing certain cations in preference to others from aqueous solutions of two or more kinds of cations has been found to be changed to only moderate extent, or not at all, by the presence of anion-exchanging groups in said agent, similarly, the selectivity of the anion-exchanging groups of an amphoteric ion exchange agent, in absorbing certain anions in preference to others from an aqueous solution containing two or more kinds of anions, has been found to be changed to only a moderate extent, or not at all, by the presence of the cation-exchanging groups in the agent. Non-amphoteric ion exchange agents, e.g. cation exchange agents, have often been employed in the art for the selective chemical absorption of certain ions in preference to others so as to effect a separation of ions in a starting solution from one another. The known principles and information as to the selective ion absorptive properties of various types of non-amphoteric ion exchange agents, such as cation exchange agents containing sulfonate or carboxylate groups or anion exchange agents containing primary-, secondary-, or tertiary-amino groups or quaternary ammonium radicals, in absorbing certain cations or anions in preference to others from aqueous starting solutions is in most instances applicable in estimating with a fair accuracy the ion absorptive selectivity properties of amphoteric ion exchange agents containing the same kind of cation-exchanging or anion-exchanging groups when the amphoteric ion exchange agents are to be applied under otherwise similar conditions for the treatment of similar starting solutions.

Thus, by first contacting an amphoteric ion exchange agent, preferably one of the aforementioned amphoteric composite ion exchange resin bodies in granular form, with a stream of an aqueous starting solution containing more than one kind of cations, or more than one kind of anions, to saturate the agent by chemical absorption of only a portion of the cations, or of the anions, in the starting solution, one of the kinds of cations, or of anions, in the starting solution can preferentially be chemically absorbed by the amphoteric ion exchange agent to leave a major portion of the other kind of cations or anions of the starting solution dissolved in the resulting liquor. The latter may be removed from contact with the ion exchange material. By subsequently contacting the thus-loaded amphoteric ion exchange agent with a stream of water, the chemically absorbed ions can be extracted from the agent to regenerate the latter. Thus, an at least partial separation of two or more kinds of cations, or of anions, present in a starting solution can be effected.

The method of the invention can be applied not only to effect the separations of solutes, or ions, from one another which have hereinbefore been mentioned, but also to cause occurrence of metathesis reactions. For instance, the invention can be applied to produce $MgBr_2 \cdot 6H_2O$ and $NaCl$ from an aqueous solution prepared by dissolving $NaBr \cdot 2H_2O$ and its chemical equivalent of $MgCl_2 \cdot 6H_2O$ in water even though on a molar basis the starting compounds, $NaBr \cdot 2H_2O$ and $$MgCl_2 \cdot 6H_2O$$

are less soluble in water at room temperature than are the respective products, $NaCl$ and $MgBr_2 \cdot 6H_2O$.

The following examples describe ways in which the invention has been practiced and illustrate certain of its advantages, but are not to be construed as limiting its scope.

*Example 1*

This example illustrates treatment of an aqueous solution of sugar (sucrose) and salt (NaCl) by the method of the invention to effect a substantial separation of the sugar and salt from one another. In the process there was employed an amphoteric composite ion exchange resin which was prepared as follows: A 2100 ml. bed of an anion exchange resin in the form of beads of from 50 to 100 Tyler screen mesh sizes was treated with sufficient water to fill the spaces between the granules. The anion exchange resin was one that had been formed by reacting trimethylamine with a nuclear chloromethylated copolymer of about 84 weight percent styrene, 8 percent ethylvinylbenzene and 8 percent divinylbenzene. The mixture of water and the anion exchange resin was cooled, e.g. to about 0–10° C., in a waterbath and a 200 ml. portion of glacial acrylic acid was added with stirring. Cooling was continued and the mixture was permitted to stand for 2 hours. Another 400 ml. portion of glacial acrylic acid was added, after which the mixture stood in the cooling bath for 12 hours. Five grams of potassium persulfate was then added and the mixture was maintained at about 12° C. for 5½ hours. A stream of nitrogen was next passed through the mixture, to sweep any air therefrom, and 5 grams of sodium sulfite was added with stirring. The resulting mixture was permitted to stand in the closed vessel without being stirred for 19 hours. It was then heated at from 75° to 85° C. for 2 hours so as to complete the polymerization of the acrylic acid. The resulting mixture was washed with water to remove readily soluble material from the surfaces of the resin beads. The latter were admixed with 6 liters of an aqueous 2-normal sodium hydroxide solution and the mixture was heated to about 90° C. for 16 hours. The mixture was filtered and the bed of resin beads was washed thoroughly in a stream of water. The water-soaked beads thus prepared and conditioned had a bed volume of 2860 ml. A portion of the resin was tested and found to contain about 1.0 chemical equivalent weight of carboxy radicals per chemical equivalent weight of quaternary ammonium radicals. A glass tube of 1.5 cm. internal diameter was filled to a depth of 56 cm. with the resin beads thus prepared and sufficient water was added to cover the bed of beads. Into the bed there was fed, at a rate of 3 ml. per minute, a 6 ml. quantity of an aqueous sugar and salt solution which quantity of said solution contained 2 grams of sucrose (the sugar) and 0.67 gram of sodium chloride as the salt. A corresponding amount of water was displaced from the bed by the introduction of the solution. The feed of the sugar and salt solution was then interrupted and water was slowely fed to the bed. During these operations of feeding a portion of the starting solution and then water to the bed, the resulting effluent liquor was collected in small successive portions and each portion was tested to determine its index of refraction at 35° C. and to determine the concentration, as normality, of sodium chloride therein. These values, found for successive portions of the effluent liquor, were plotted as a graph shown as FIG. 1 of the drawing. In the graph, the index of refraction curve represents a combination of the changes in concentration both of sugar and of salt in successive portions of the effluent liquor. However, in the graph the early, and the maximum, index of refraction values shown were obtained for portions of the effluent liquor containing low, i.e. far less than the peak concentrations of sodium chloride. Accordingly, for practical purposes the portion of the index of refraction curve giving values for the 40–80 ml. fractions of the effluent liquor can be taken as representing commensurate concentrations of sugar. The graph shows that the method was highly effective in separating the sugar and salt from one another, i.e. the peak concentration values for these ingredients are obtained in widely separated fractions of the effluent liquor.

*Example 2*

Figure 2:
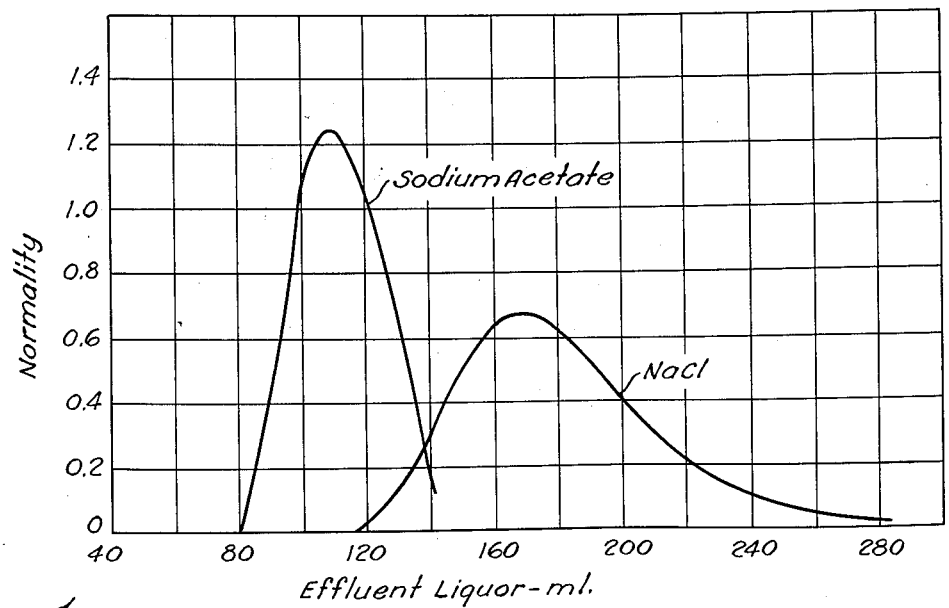

A 25 ml. portion of an aqueous starting solution of sodium acetate in 2.0 normal concentration and sodium chloride in 2.09 normal concentration was fed at a rate of about 60 drops per minute to a column of 1.77 cm. internal diameter which was filled to a depth of 71.2 cm. with a granular composite amphoteric ion exchange resin of the kind employed in Example 1. Water was then fed to the column at a similar rate until the concentrations of sodium acetate and of sodium chloride in the resulting effluent liquor had increased to peak values and then diminished to a point at which the liquid flowing from the column was nearly pure water containing only a trace of sodium chloride. This completed a first cycle of the operations of the process. Another 25 ml. portion of the same aqueous starting solution was then fed at the above-stated rate to the column after which water was fed to the column at a similar rate of flow. The resulting effluent liquor was collected in small successive portions and each portion was analyzed to determine the concentrations of acetate and chloride ions therein. FIG. 2 of the drawing is a graph indicating the concentration, expressed as normality, of said ions in successive portions of the effluent liquor collected in carrying out the second cycle of operations of the process. The graph shows that the process was highly effective in separating the acetate and chloride ions from one another.

*Example 3*

Figure 3:
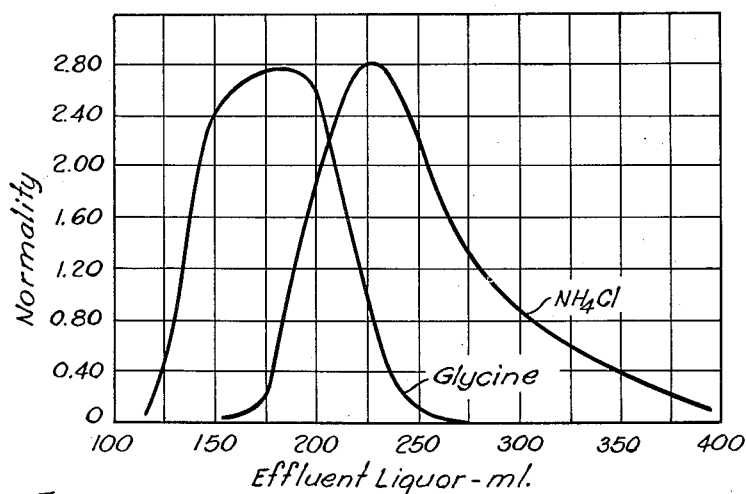

A 250 ml. bed of granular ion exchange material of the kind employed in Example 1, which bed was contained in a column of 2.1 cm. internal diameter, was conditioned for use in the following tests by slowly passing 600 ml. of an aqueous starting solution of glycine, in 2.6-normal concentration, and ammonium chloride, in 2.65-normal concentration, therethrough and then slowly passing several liters of water through the bed to extract the glycine and ammonium chloride therefrom as thoroughly as possible and thus regenerate the amphoteric ion exchange resin. A further 100 ml. portion of the starting solution was then slowly fed to the column in a manner displacing water from the column. Water was then fed to the column. The resulting effluent liquor was collected in small successive portions and each portion was analyzed to determine the concentrations, i.e. normality, of glycine and ammonium chloride therein. FIG. 3 is a graph based on the data obtained. The graph shows that a considerable separation of the glycine from the ammonium chloride was accomplished.

*Example 4*

Figure 4:
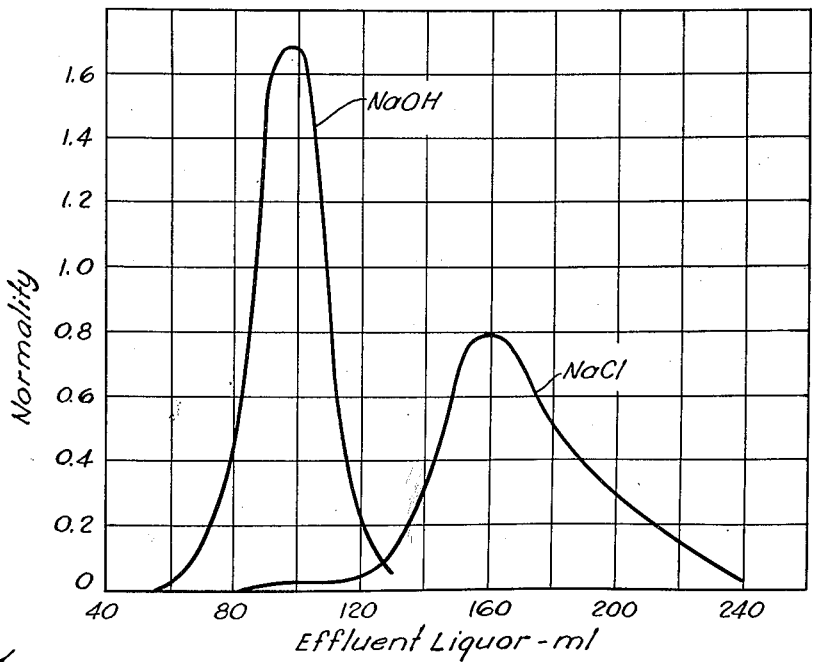

An aqueous starting solution of sodium hydroxide in 1.96 normal concentration and sodium chloride in 1.99 normal concentration was employed in a test of the invention. Except for the kind of starting solution which was employed, the procedure in carrying out the test was similar to that described in Example 2. FIG. 4 is a graph showing the concentration, expressed as normality, of sodium hydroxide and sodium chloride in successive portions of the effluent liquor obtained in the second cycle of operations of the process. It shows that the sodium hydroxide and sodium chloride were effectively separated from one another.

*Example 5*

Figure 5:
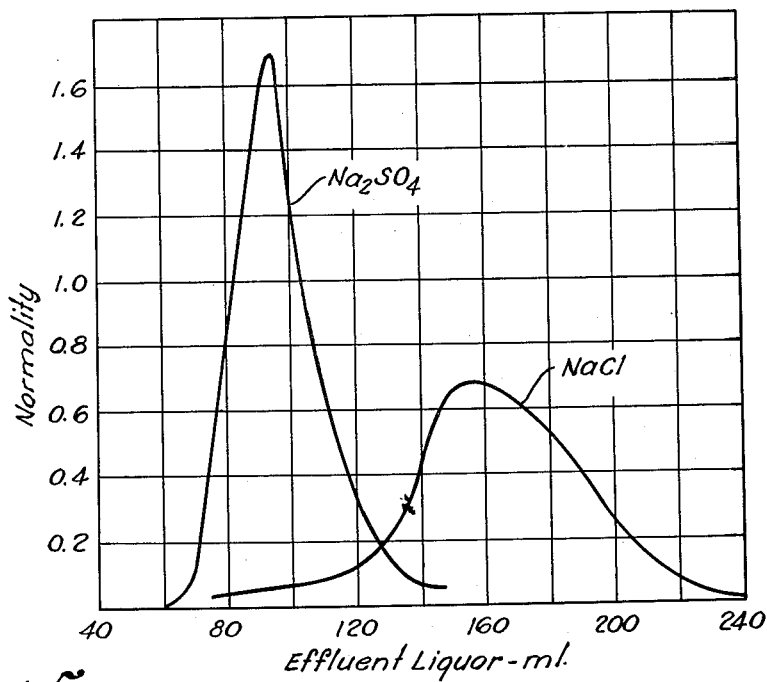

An aqueous starting solution of sodium sulfate in 1.99 normal concentration and sodium chloride in 2.02 normal concentration was tested in a manner and under conditions otherwise similar to those described in Example 2. FIG. 5 is a graph giving the normality of sodium sulfate and of sodium chloride in successive portions of the effluent liquor obtained in the second cycle of operations of the process.

*Example 6*

At amphoteric composite ion exchange resin comprising (a) a cross-linked nuclear sulfonated copolymer of 92 weight percent styrene, 4 percent ethylvinylbenzene, and 4 percent divinylbenzene as one ingredient and (b) a homopolymer of vinylbenzyl-trimethyl ammonium hydroxide as the other resin ingredient was employed in this experiment. Ingredient (a) is the acidic form of a cation exchange resin which is insoluble in water, and in aqueous solutions of acids, bases, or salts, and also in most organic liquids. Ingredient (b) is, of itself, normally soluble in water. However, it was formed within ingredient (a) by soaking granules of ingredient (a) in an aqueous solution of vinylbenzyl-trimethyl ammonium hydroxide for several days, treating the mixture with sufficient hydrochloric acid to bring it to a pH value of 6.8, adding a minor amount of tertiary butyl peroxide as a polymerization catalyst, and heating the mixture in a closed vessel and in contact with an atmosphere of nitrogen at temperatures of 75–80° C. for 20 hours to polymerize the vinylbenzyl ammonium compound. The resulting granular composite resin product was thoroughly washed successively with water, an aqueous sodium chloride solution, and again with water. A portion of the granular composite resin was tested and found to contain approximately 1.7 meq. of quaternary ammonium radicals and about 1.7 meq. of sulfonate radicals per ml. of a bed of the resin. The composite resin was in the form of beads, or rounded granules, of from 50 to 100 Tyler screen mesh sizes.

Figure 6:
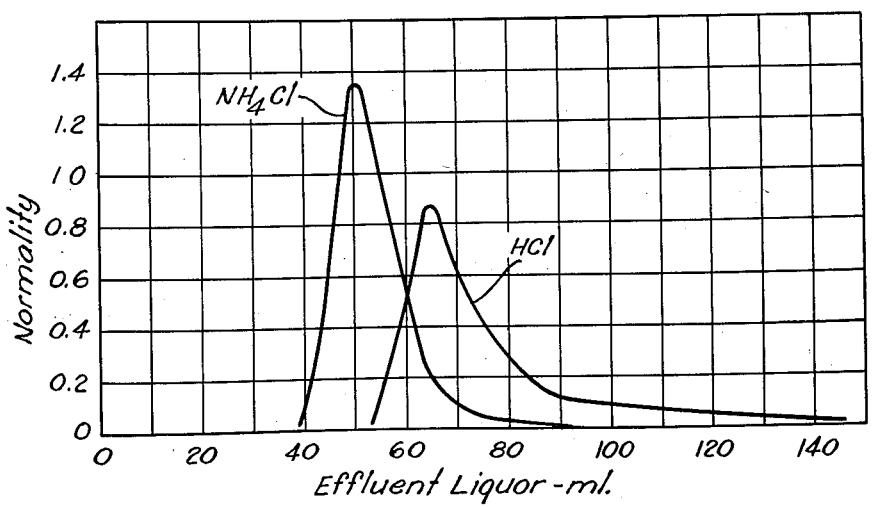

A column of 1.5 cm. internal diameter was charged with sufficient of the granular composite resin to form a 66 ml. bed of the resin granules. The resin was preconditioned for the desired test by passing 500 ml. of an aqueous starting solution of ammonium chloride in 1.86 normal concentration and hydrochloric acid in 1.80 normal concentration through the bed of resin and then passing several liters of water through the bed of resin. A further 10 ml. portion of said starting solution was then fed at a rate of 3 ml. per minute to the bed of resin. Water was then fed to the bed at a similar rate. The resulting effluent liquor was collected in small successive portions, each of which was analyzed to determine the concentrations of ammonium chloride and hydrochloric acid therein. FIG. 6 is a graph showing the normality of ammonium chloride and of hydrochloric acid in the successive portions of the effluent liquor.

*Example 7*

Figure 7:
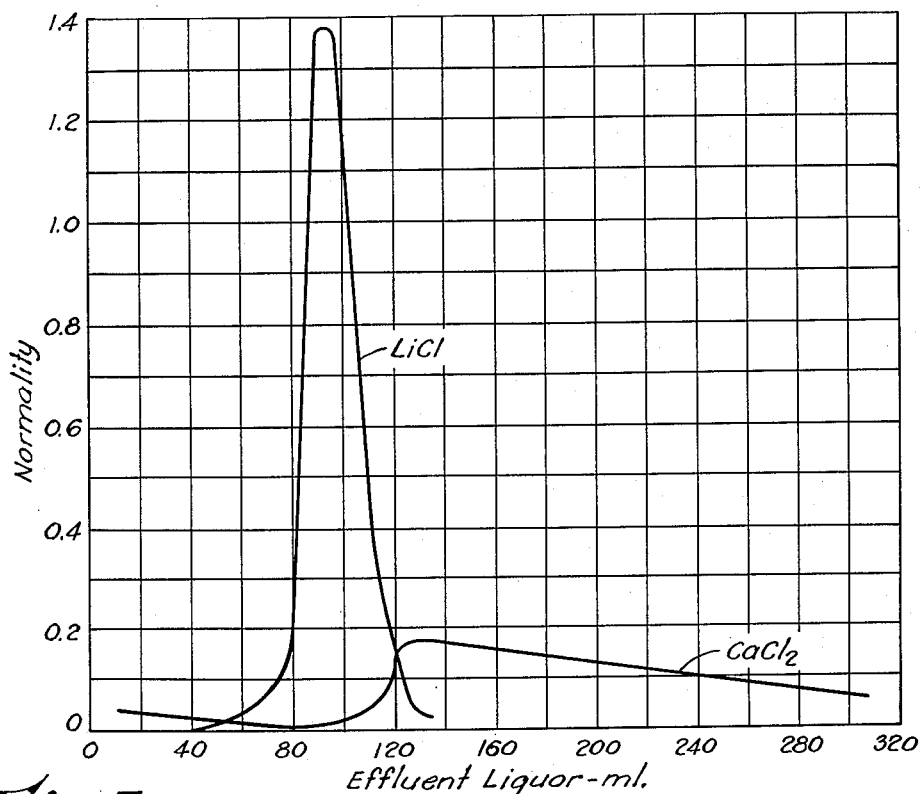

A column of 1.5 cm. internal diameter was charged with an 82 ml. bed of a granular amphoteric composite ion exchange resin similar to that described in Example 1. A 41 ml. portion of an aqueous starting solution of calcium chloride in 0.95 normal concentration and lithium chloride in 0.91 normal concentration was fed at a rate of 3 ml. per minute to the column containing the resin bed immersed in water, thereby displacing an equal volume of water from the column. A 500 ml. portion of water was then fed at a similar rate to the column, causing an equal volume of liquid to flow from the column. This completed a first cycle of the operations involved in the process. Three more cycles of the process were carried out in similar manner, i.e. by alternately feeding a portion of the starting solution and then water to the column. In the fourth cycle of the process, effluent liquor from the column was collected in small successive portions and each portion was analyzed to determine the concentration, in normality, of calcium chloride and lithium chloride therein. FIG. 7 is a graph based on the data thus obtained.

*Example 8*

Figure 8:
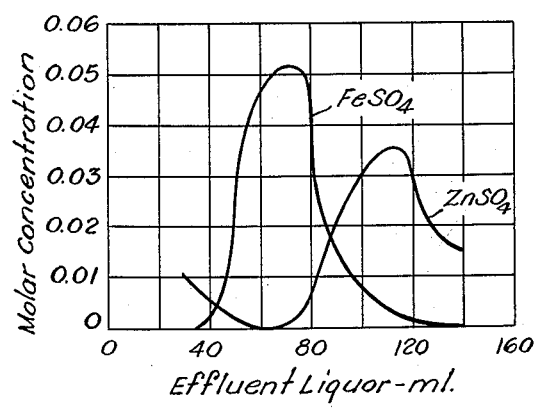

An aqueous starting solution of ferrous sulfate in 0.066 molar concentration and zinc sulfate in 0.061 molar concentration was treated in accordance with the method of the invention by alternately feeding a 40 ml. portion of the starting solution and 500 ml. of water to an 84 ml. bed of granular ion exchange material in each operating cycle of the process. Five such cycles were carried out. In the fifth cycle, the effluent liquor from the bed was collected in small portions and each portion was analyzed to determine the molar concentrations of ferrous sulfate and zinc sulfate therein. Except for the details just mentioned, the procedure and the granular amphoteric ion exchange material employed were substantially as described in Example 7. FIG. 8 is a graph indicating the molar concentrations of ferrous sulfate and zinc sulfate in a number of the successive portions of effluent liquor collected in the fifth cycle of the process.

The method of the invention has been applied in treating various other aqueous solutions of two or more solutes, at least one of which was ionizable, to effect an at least partial separation of the solutes present. For instance, it has been applied in treating an aqueous solution of copper ammino nitrate and silver ammino nitrate to obtain a substantial separation of these solutes from one another; it has been applied in treating an aqueous solution of sucrose and potassium aconitate to obtain an appreciable degree of separation of these solutes; it has been applied in treating an aqueous solution of sodium chloride, sodium bromide, and sodium iodide to obtain a substantial separation of these three solutes from one another; and it has been applied in treating an aqueous solution of ferric sulfate and sulfuric acid to obtain partial separation of these solutes. In all of these instances each cycle of the process involved alternately contacting a body of an amphoteric ion exchange agent first with a stream of the starting solution and then with a stream of water.

I claim:

1. A method for separating at least two solutes, including an ionizable solute, from one another which comprises contacting a granular amphoteric ion exchange agent, individual granules of which are each an insoluble composite body of at least two intimately associated solid resin ingredients, including an insoluble cross-linked resin, one of which resin ingredients contains cation exchanging groups and another of which resin ingredients contains anion exchanging groups, which an aqueous starting solution of the solutes to cause at least an ionizable portion of the solutes to be absorbed from the solution by the agent, removing the resulting aqueous liquor from contact with the agent, and washing the agent with an aqueous liquid which initially is substantially free of the ions absorbed by the agent, whereby ions chemically absorbed by the agent are extracted from the agent to regenerate the latter and separating the aqueous extract from the thus-regenerated agent and, during the operations just described, separating from one another an early fraction of the effluent liquor, thus removed from contact with said agent, containing a higher ratio of a first kind of solute relative to a second kind of solute than that in said starting solution, and a later fraction of said effluent liquor containing a higher ratio of said second kind of solute relative to said first kind of solute than that in said starting solution.

2. A method according to claim 1 wherein the aqueous starting solution is a solution of at least two ionizable solutes, and wherein the early fraction, of the effluent liquor, which is separated contains a higher ratio of a first kind of said ionizable solute relative to a second kind of said ionizable solute than that in the starting solution, and the later fraction, of the effluent liquor, which is separated contains a higher ratio of said second kind of ionizable solute relative to said first kind of ionizable solute than that in said starting solution.

3. A method, as claimed in claim 1, wherein the amphoteric ion exchange agent is repeatedly contacted in alternate manner with a stream of the aqueous starting solution and a stream of water and the resulting effluent liquor which flows out of contact with said agent is collected in fractions, whereby there is obtained an effluent liquor fraction containing a higher ratio of one of the solutes to a second of the solutes than was in the starting solution and a subsequent effluent liquor fraction containing a higher ratio of the second solute to the first of these solutes than was in the starting solution.

4. A method for separating at least two solutes, including an ionizable solute, from one another which comprises contacting a reactive form of a granular amphoteric ion exchange agent, individual granules of which are each an insoluble composite body of at least two intimately associated solid resin ingredients, including an insoluble cross-linked resin, one of which resin ingredients contains cation exchanging groups and another of which resin ingredients contains anion exchanging groups, with an amount of an aqueous starting solution of the solutes such that said agent chemically absorbs ions, but not all of the solutes, from the solution and thus changes the relative proportions of the solutes in the aqueous liquor, removing the resulting aqueous liquor from contact with the amphoteric ion exchange agent containing the chemically absorbed ions, and washing the agent with an aqueous liquid which initially is substantially free of the ions absorbed by the agent, whereby at least a portion of the ions chemically absorbed by the agent are extracted from the agent to regenerate the latter and form an aqueous solution of an ionizable solute.

5. A method, as claimed in claim 4, wherein the amphoteric ion exchange agent is repeatedly contacted in alternate manner with a stream of the aqueous starting solution and a stream of water.

6. A method for separating at least two solutes, including an ionizable solute, from one another which comprises bringing a reactive granular amphoteric ion exchange agent, individual granules of which are each an insoluble composite body of at least two intimately associated solid resin ingredients, including an insoluble cross-linked resin ingredient and a normally water-soluble ionizable resin ingredient which is insolubilized by the intimate association with the insoluble cross-linked resin ingredient, one of which resin ingredients contains cation-exchanging groups, and another of which contains anion-exchanging groups, the amphoteric composite ion exchange resin body as a whole containing an average of from 0.3 to 3 chemical equivalents of anion-exchanging groups per chemical equivalent of cation-exchanging groups, into contact with an amount of an aqueous starting solution of the solutes such that said agent chemically absorbs ions, but not all of the solutes, from the solution and thus changes the relative proportions of the solutes in the aqueous liquor, removing the resulting aqueous liquor from contact with the amphoteric ion exchange agent, and washing the agent with water, whereby chemically absorbed ions are extracted from the amphoteric ion exchange agent to regenerate the latter and an aqueous solution of an ionizable solute is formed.

7. A method, as claimed in claim 6, wherein the amphoteric ion exchange agent is repeatedly contacted in alternate manner with a stream of the aqueous starting solution and with a stream of water, the contact with the stream of starting solution resulting in chemical absorption by the agent of ions from the solution and thus changing the relative proportions of solutes in the solution and the contact with the stream of water resulting in extraction of chemically absorbed ions from the amphoteric ion exchange agent to regenerate the latter and form an aqueous solution of an ionizable solute.

8. A method, as claimed in claim 6, wherein a portion of the starting solution is fed to a water-immersed bed of the granular amphoteric ion exchange agent in a manner causing flow of water through and from the bed, the feed of the starting solution is interrupted and water is fed in similar manner to the bed, the resulting effluent liquor is collected in successive fractions, whereby there is obtained a fraction containing a higher ratio of one solute to a second of the solutes than was in the starting solution and a subsequent fraction containing a higher ratio of the second solute to the first of these solutes than was in the starting solution, and the cycle of operations just mentioned is repeated.

9. A method, as claimed in claim 8, wherein the starting solution is an aqueous solution of sucrose and an alkali metal chloride and, in each cycle of the operations involved in the process, a fraction of the effluent liquor contains a higher weight ratio of sucrose to the alkali metal chloride than the starting solution and a subsequent fraction of the effluent liquor contains a higher weight ratio of the alkali metal chloride to sucrose than the starting solution.

10. A method, as claimed in claim 8, wherein the starting solution is an aqueous solution of glycine and ammonium chloride and, in each cycle of the operations involved in the process, a fraction of the effluent liquor contains a higher weight ratio of glycine to ammonium chloride than the starting solution and a later fraction contains a higher ratio of ammonium chloride to glycine than the starting solution.

11. A method for separating at least two solutes, including an ionizable solute, from one another which comprises contacting a granular amphoteric ion exchange agent (individual granules of which are each an insoluble composite body of at least two intimately associated solid resin ingredients, including an insoluble, cross-linked resin ingredient, one of which resin ingredients is a cation-exchanging resin and another of which resin ingredients is an anion-exchanging resin, the resin ingredients of said composite body being brought into the intimate association with one another by a procedure which comprises causing a preformed resin to absorb a liquid monomer which is polymerizable to form a resin different from that initially present and polymerizing said monomer while it is thus-absorbed) with an aqueous starting solution of the solutes to cause at least an ionizable portion of the solutes to be absorbed from the solution by the agent, withdrawing the resulting aqueous liquor from contact with the agent, and washing the agent with an aqueous liquid which initially is substantially free of the ions absorbed by the agent, whereby ions chemically absorbed by the agent are extracted from the agent to regenerate the latter, withdrawing the aqueous extract from the thus-regenerated agent and, during the operations just described, separating from one another an early fraction of the effluent liquor, thus withdrawn from contact with said agent, containing a higher ratio of a first kind of solute relative to a second kind of solute than that in said starting solution, and a later fraction of said effluent liquor containing a higher ratio of said second kind of solute relative to said first kind of solute than that in said starting solution.

12. A method of treating an aqueous starting solution of sodium hydroxide and sodium chloride, as solutes, to separate the sodium hydroxide and sodium chloride from one another, which method comprises (1) feeding a portion of said starting solution to a water immersed bed of a granular amphoteric ion exchange agent (individual granules of which are each an insoluble composite body of at least two intimately associated solid resin ingredients, including an insoluble cross-linked resin ingredient and a normally water-soluble ionizable resin ingredient which is insolubilized by the intimate association with the insoluble cross-linked resin ingredient, one of which resin ingredients contains ionizable carboxylate radicals as cation-exchanging groups thereof and another of which resin ingredients contains quaternary ammonium radicals as anion-exchanging groups thereof, the amphoteric composite ion exchange resin body as a whole containing an average of from 0.3 to 3 chemical equivalents of anion-exchanging groups per chemical equivalent of cation-exchanging groups), said portion of the starting solution being in amount such that said agent chemically absorbs ions, but not all of the above-mentioned solutes, from the portion of the starting solution thus fed into contact therewith, and thus changes the relative proportions of the above-mentioned solutes in the aqueous liquor, said portion of the starting solution being fed to the water-immersed bed of the granular amphoteric ion exchange agent in a manner causing flow of water through and from the bed; (2) then interrupting the feed of the starting solution to the bed, (3) thereafter feeding water to the bed and (4) collecting successive fractions of the resulting effluent liquor, whereby in each operating cycle involving the steps just stated there are obtained an effluent liquor fraction which contains a higher ratio of sodium hydroxide to sodium chloride than the starting solution and a subsequent effluent liquor fraction that contains a higher ratio of sodium chloride to sodium hydroxide than the starting solution.

13. A method of treating an aqueous starting solution of lithium chloride and calcium chloride, as solutes, to separate the lithium chloride and calcium chloride from one another, which method comprises feeding a portion of said starting solution to a water-immersed bed of a granular amphoteric ion exchange agent (individual granules of which are each an insoluble composite body of at least two intimately associated solid resin ingredients, including an insoluble cross-linked resin ingredient and a normally water-soluble ionizable resin ingredient which is insolubilized by the intimate association with the insoluble cross-linked resin ingredient, one of which resin ingredients contains cation-exchanging groups and another of which contains anion-exchanging groups, the amphoteric composite ion exchange resin body as a whole containing an average of from 0.3 to 3 chemical equivalents of anion exchanging groups per chemical equivalent of cation-exchanging groups) in amount such that said agent absorbs ions, but not all of the above-mentioned solutes, from the portion of the starting solution thus fed into contact therewith, and thus changes the relative proportions of the above-mentioned solutes in the aqueous liquor, said portion of the starting solution being fed to the water-immersed bed of the granular amphoteric ion exchange agent in a manner causing flow of water through and from the bed, then interrupting the feed of the starting solution to the bed, thereafter feeding water to the bed, and collecting successive fractions of the resulting effluent liquor, whereby in each operating cycle involving the steps just stated there are obtained an effluent liquor fraction which contains a higher weight ratio of lithium chloride to calcium chloride than the starting solution and a later effluent liquor fraction which contains a higher ratio of calcium chloride to lithium chloride than the starting solution.

14. A method of treating an aqueous starting solution of ferrous sulfate and zinc sulfate to separate the ferrous sulfate and zinc sulfate from one another, which method comprises feeding a portion of said starting solution to a water-immersed bed of a granular amphoteric ion exchange agent (individual granules of which are each an insoluble composite body of at least two intimately associated solid resin ingredients, including an insoluble cross-linked resin ingredient and a normally water-soluble ionizable resin ingredient which is insolubilized by the intimate association with the insoluble cross-linked resin ingredient, one of which resin ingredients contains cation-exchanging groups and another of which contains anion-exchanging groups, the amphoteric composite ion exchange resin body as a whole containing an average of from 0.3 to 3 chemical equivalents of anion-exchanging groups per chemical equivalent of cation-exchanging groups) in amount such that said agent absorbs ions, but not all of the above-mentioned solutes, from the portion of the starting solution thus fed into contact therewith, and thus changes the relative proportions of the above-mentioned solutes in the aqueous liquor, said portion of the starting solution being fed to the water-immersed bed of the granular amphoteric ion exchange agent in a manner causing flow of water through and from the bed; then interrupting the feed of the starting solution to the bed, thereafter feeding water to the bed, and collecting successive fractions of the resulting effluent liquor, whereby in each operating cycle involving the steps just-stated there are obtained an effluent liquor fraction which contains a higher weight ratio of ferrous sulfate to zinc sulfate than the starting solution and a later effluent liquor fraction which contains a higher ratio of zinc sulfate to ferrous sulfate then the starting solution.

References Cited in the file of this patent

UNITED STATES PATENTS

| | | |
|---|---|---|
| 2,275,210 | Urbain et al. | Mar. 3, 1942 |
| 2,461,505 | Daniel | Feb. 15, 1949 |
| 2,564,820 | Smit | Aug. 21, 1951 |
| 2,578,937 | Kunin et al. | Dec. 18, 1951 |
| 2,578,938 | Kunin et al. | Dec. 18, 1951 |
| 2,684,331 | Bauman | July 20, 1954 |
| 2,738,322 | Bauman | Mar. 13, 1956 |

FOREIGN PATENTS

| | | |
|---|---|---|
| 670,350 | Great Britain | Apr. 16, 1952 |
| 681,411 | Great Britain | Oct. 22, 1952 |

OTHER REFERENCES

Chemical & Engineering News, page 4064, vol. 30, Sept. 29, 1952.

Hatch et al.: Ind. Eng. Chem. 49, 1812–1819, 1957.

"Ion Retardation," Dow Chemical Co. bulletin.

UNITED STATES PATENT OFFICE
CERTIFICATE OF CORRECTION

Patent No. 3,078,140            February 19, 1963

Melvin J. Hatch

It is hereby certified that error appears in the above numbered patent requiring correction and that the said Letters Patent should read as corrected below.

Column 9, line 64, for "then" read -- next --; column 11, line 65, for "which" read -- with --.

Signed and sealed this 21st day of January 1964.

(SEAL)
Attest:

ERNEST W. SWIDER
Attesting Officer

EDWIN L. REYNOLDS

Acting Commissioner of Patents